May 31, 1966   P. E. DESHAIES   3,253,647
FUEL PREHEATER
Filed Nov. 18, 1963
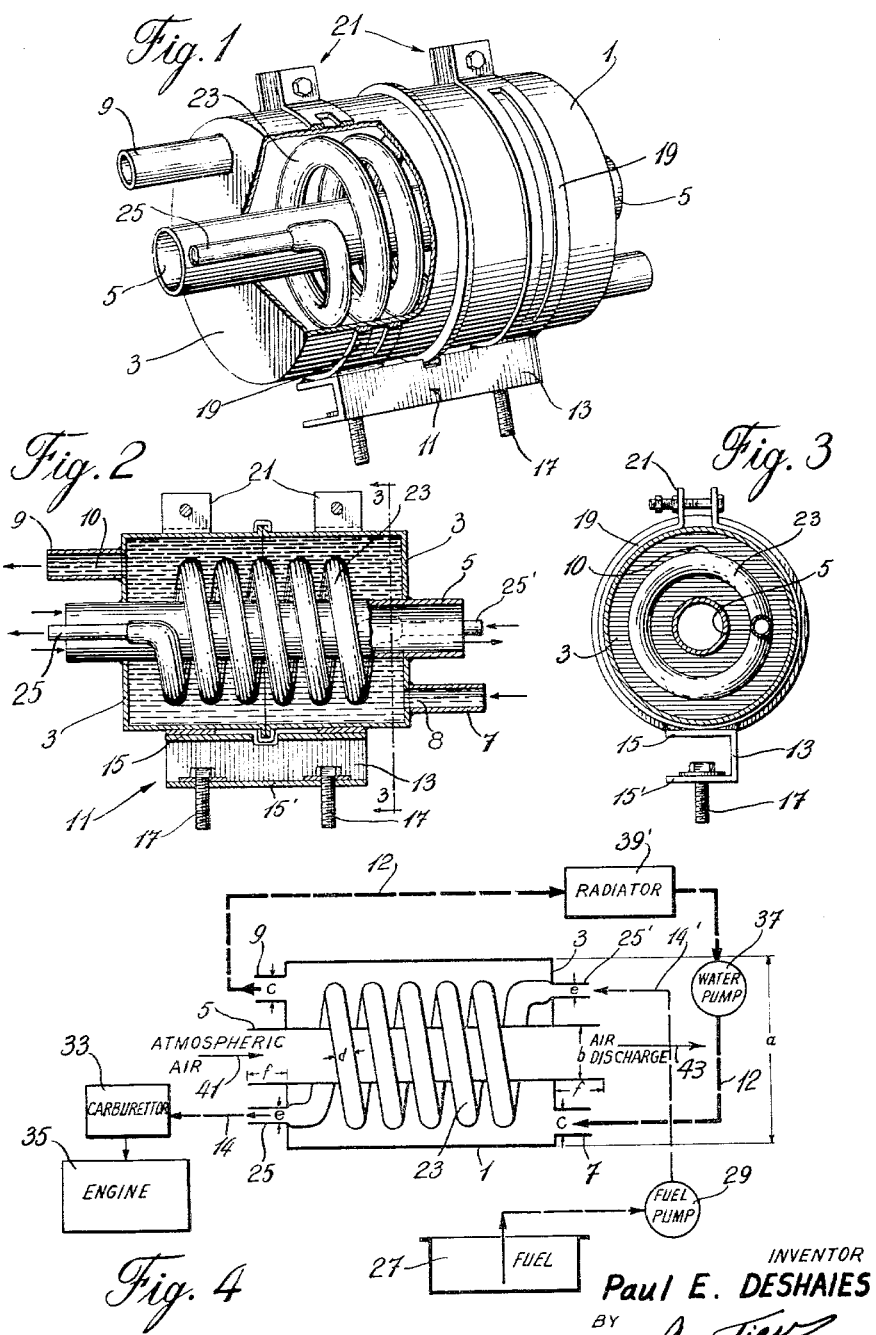
INVENTOR
Paul E. DESHAIES
BY
ATTORNEYS

United States Patent Office 3,253,647
Patented May 31, 1966

3,253,647
FUEL PREHEATER
Paul Emile Deshaies, St.-Sylvere, Nicolet,
Quebec, Canada
Filed Nov. 18, 1963, Ser. No. 324,508
9 Claims. (Cl. 165—44)

The present invention relates to a fual preheater and more particularly to a heat exchanger for heating the fuel of a combustion engine before its admission into the carburetor.

A main object of the invention is to provide a fuel preheater which, not only increases the general efficiency of the engine by supplying hot fuel thereto which is advantageous, particularly in winter, but which also includes features whereby a substantial amount of heat may be picked up from the heating fluid in an efficient manner.

Another important object of the invention resides in providing such a fuel preheater which is in the form of a tank into which a heating coil is centrally located and including a cooling tube through the center and along the axial length of the tank and of the coil, the tube being of such cross-section as to cause a more even temperature distribution from the outer wall of the tank to the wall of the central tube and between the coil spires whereby to prevent overheating of the components at the center or overheating of the fuel.

Yet another object of the invention lies in the provision of a preheater of the above type which uses the radiator water as a heating medium whereby still improving the efficiency of the engine by preventing part of the heat in the engine cooling water to go to waste in the atmosphere.

These various objects are attained in a fuel perheater for use with a combustion engine, comprising: a tank adapted to be filled with a heating fluid and having an outer shell closed by two end walls; a heating fluid inlet pipe and a heating fluid outlet pipe mounted respectively on one and on the other end of said tank outwardly thereof relative to the central axis of the shell that extends through the end walls; a central air cooling conduit mounted along the central axis of the shell and through the end walls; the transverse cross-section of the conduit being of such size that, in conjunction with the positioning of the heating fluid inlet pipe outwardly of the tank, a practically uniform temperature exists throughout the heating fluid, and a fuel coil mounted within the tank and winding around the central conduit; the coil having ends respectively extending through one and the other end of the tank.

In accordance with a preferred embodiment of the invention, the coil portion between the coil ends is of larger cross-section than the cross-section of the coil ends themselves thereby providing a reservoir effect whereby the retention time of the fuel in the heating fluid is increased, thus allowing a greater heat pick-up.

A better understanding of the invention will be had by the following description of a preferred embodiment, the description having reference to the appended drawings wherein:

FIG. 1 is a perspective view of the preheater of the invention, part of the outer shell being removed to illustrate the inner structure;

FIG. 2 is a longitudinal cross-sectional view through the preheater;

FIG. 3 is a transverse cross-section of the preheater taken along line 3—3 of FIG. 2;

FIG. 4 is a diagram intended to illustrate the mounting of the preheater in the general assembly of a combustion engine.

The preheater of the invention generally comprises a preferably cylindrical outer shell 1 closed by two end walls 3. A central conduit 5, preferably cylindrical, is mounted along the longitudinal axis of outer shell 1, and extends through the end walls 3 to which it is secured, preferably by welding or other similar fastening means.

An inlet water pipe nipple 7 is fixed around an inlet aperture 8 at the bottom of the tank, through one end wall 3, and an outlet pipe nipple 9 is also provided, around outlet aperture 10, through the other tank end 3. Inlet pipe nipple 7 is mounted at the bottom of the tank while outlet pipe nipple 9 is preferably mounted at the top thereof.

Securing means 11 is provided to mount the tank 1 on the combustion engine block. The said means 11 is formed, for instance, of a generally channel-shaped member 13 one flange of which should be fastened to shell 1 while the other is provided with a plurality of bolts 17 adapted to be received by appropriate means on the engine block. Member 13 is welded or otherwise secured to straps 19 which are provided with clamp means 21 for mounting over shell 1 in a removable manner.

Thus, by its contact with metallic straps 19 and shell 1, the web 13 and flange 15' serve as heat dissipators for a purpose to be determined later.

Within the carburetor is mounted a coil 23 having two ends 25, 25' projecting through end walls 3 of tank 1. As is the case with central tube 5 and pipe nipples 7, 9, ends 25, 25' are secured to end walls 3, preferably by welding. It should be noted now that the helical portion 23 of the coil is of greater diameter than that of ends 25, 25' for a purpose to be explained hereinafter.

The fuel and air preheater just described is mounted in the engine circuit as generally illustrated diagrammatically in FIG. 4. Pipe nipples 7, 9 are connected, through piping 12 to an inlet to a radiator circuit comprising water pump 37 and radiator 39. Coil end 25 is connected to an inlet carburetor 33 through pipe 14, while coil end 25' is connected to fuel pump 29 and fuel reservoir 27 through piping 14'.

The fuel is pumped from fuel tank 27 by means of fuel pump 29 the outlet of which is connected to the inlet end 25' of the coil whereas the outlet end 25 of the same coil is directed to the carburetor 33, the latter being connected to the engine 35 proper. Simultaneously, water pump 37 draws water from radiator 39 and discharges it into the water inlet nipple 7. Water then moves out of tank 1 through outlet nipple 9 and is set back to radiatior 39. Simultaneously also, air enters into central conduit 5 as indicated by arrow 41 and exits through the other end indicated by arrow 43.

Thus, the radiator water serves to heat the fuel, while the air through tube 5 serves to ensure a practically even temperature throughout the water in the tank, as will now be explained.

The preheater is mounted vertically on the engine block by means of the securing means 11, aforedescribed, so that the hot water comes in at the bottom of the tank and rises to the outlet nipple 9. As will have been noted, the central conduit or tube 5 is of substantial size and by properly disposing the inlet pipe 7 adjacent shell 1, that is, close to the wall exposed to atmospheric air, and by further providing additional heat dissipator in the form of the channel member 13, it is possible to cause the temperature of the water near the center and around conduit 5 to be about the same as that along the inner surface of shell 1. The advantage of properly proportionating the diameter of central conduit 5 in relation to outer shell 1 is to prevent hot spots in the liquid, particularly at the center, which would cause overheating of the fuel.

The presence of central tube 5 and the particular type of securing means 11 will of course lower the average temperature in the water bath and in order to compensate for the loss and allow the fuel to pick-up as much heat as is practical, the helical portion of coil 23 is made of a larger diameter than the piping 14, 14' leading from the fuel tank into the carburetor and represented in the drawings by the coil ends 25, 25'. This increase in sectional area of the coil will thus create a reservoir effect and slow down the flow between inlet 25' to outlet 25 thus increasing the retention time of the fuel through the coil resulting in a greater heat pick-up than if the coil had been of the same diameter than the outside fuel piping 14, 14'.

Another feature to be noted, is that the air travels in reverse direction to that of the heating water whereby the gradient of temperature therebetween is substantially constant resulting in a more even heat transfer and a better efficiency.

The invention has been reduced to practice and embodied in several units of different dimensions. The following proportions are illustrative of units that have worked with great efficiency, the various units being adapted for engines of different sizes and the dimensions given are in inches.

| Unit No. | 100 | 200 | 300 | 400 | 500 |
| --- | --- | --- | --- | --- | --- |
| Length of tank | 5 | 5¾ | 8¾ | 12 | 18 |
| a | 3½ | 4 | 5½ | 8 | 12 |
| b | ½ | ¾ | 1 | 1¼ | 1¾ |
| c | ½ | ½ | ½ | 1 | 1¾ |
| d | 5/16 | ½ | ¾ | 1¼ | 1¾ |
| e | ¼ | 5/16 | 5/16 | ½ | ¾ |
| f | 1 | 1⅛ | 1⅛ | 1 | 1 |

By working out from the above dimensions, the following ratios are established:

The ratio of the diameters of the outer shell 2 and central conduit 5, that is $a/b$, is in the order of 5 to 7, the ratio of the diameters of the outer shell 2 and the inlet and outlet pipes 7 and 9, that is $a/c$ is in the order of 7 to 11 and the ratio of the diameters of the helical portion and the coil ends, that is $d/e$, is between approximately 1¼ to 2⅓.

Another advantage of the present invention is that it prevents condensation in the carburetor thus avoiding plugging of the fuel nozzles, which often happens with present day installations.

Although a specific embodiment of the invention has just been described, it will be understood that various modifications may be made thereto without departing from the spirit of the invention as the scope is now stated in the claims:

I claim:

1. A fuel and air preheater for use with a combustion engine comprising:
   (a) a tank adapted to be filled with a heating fluid and having an outer shell closed by two end walls;
   (b) a heating fluid inlet pipe and a heating fluid outlet pipe mounted respectively on one and on the other end of said tank outwardly thereof relative to the central axis of said shell that extends through the end walls thereof;
   (c) a central air cooling conduit mounted along said central axis of said shell and through said end walls;
   (d) the transverse cross section of said conduit being of such size to provide a temperature along the said conduit substantially similar to the one on the outer shell;
   (e) a fuel coil mounted within said tank and winding around said central conduit; said coil having ends respectively extending through one and the other end of said tank.

2. A fuel and air preheater as claimed in claim 1 wherein said heating fluid inlet pipe is mounted at the bottom of said tank and said heating fluid outlet pipe is mounted at the top thereof; said coil ends extending through said end walls adjacent said cooling conduit.

3. A fuel and air preheater as claimed in claim 2 including means, at the bottom of said tank for supporting the preheater on the combustion engine block; said means having a vertical fin-like surface in contact with the shell to provide extra cooling surface near the heating fluid inlet pipe.

4. A fuel and air preheater as claimed in claim 1 wherein the coil portion between the coil ends is of larger cross-section than the cross-section of the coil ends thereby providing a reservoir effect whereby the retention time of the fuel in the heating fluid is increased.

5. A fuel preheater for use with a combustion engine comprising:
   (a) a tank adapted to be filled with a heating fluid and having an outer shell closed by two end walls;
   (b) a heating fluid inlet pipe and a heating fluid outlet pipe mounted respectively on one and the other end wall adjacent the outer shell;
   (c) a central air cooling conduit mounted along the central axis of said shell and through said end walls;
   (d) the transverse cross-section of said conduit being of such size to provide a temperature along the said conduit substantially similar to the one on the outer shell;
   (e) a fuel coil mounted within said tank and winding around said central conduit; said coil having ends respectively extending through one and the other end wall of said tank and a helical portion between the ends of larger cross-section than the cross-section of the ends thereby to provide a reservoir effect whereby the retention time of the fuel in the heating fluid is increased.

6. A fuel and air preheater as claimed in claim 5 wherein said outer shell and central conduit are cylindrical and the ratio of their diameters is in the order of 5 to 7, the ratio of the diameters of said shell and of the inlet and outlet pipes is in the order of 7 to 11 and the ratio of the diameters of said helical portion and said ends of said coil being between approximately 1¼ to 2⅓.

7. In an internal combustion engine having a carburetor circuit and a radiator circuit, a fuel and air preheater comprising:
   (a) a cylindrical tank having an outer shell closed by two end walls, the said tank adapted to be filled with heating water coming from the radiator of said radiator circuit and returning to the said radiator;
   (b) a heating water inlet pipe and a heating water outlet pipe mounted respectively on one and the other end wall adjacent the outer shell; both pipes being connected respectively to an outlet port and an inlet port in the radiator circuit; the ratio of the diameters of the shell and of the pipes being in the order of 5 to 7;
   (c) a central air cooling tube mounted along the central axis of the shell and through said end walls; the ends of said tube being open to atmosphere; the ratio of the diameters of said shell and tube being in the order of 7 to 11;
   (d) a fuel coil mounted within said tank and winding around said central tube; said coil having ends respectively extending through one and the other end wall of said tank and a helical portion between the ends of larger cross-section than the cross-section of the ends thereby to provide a reservoir effect whereby the retention time of the fuel in the heating fluid is increased; the ratio of the diameter of said helical portion and of said ends being between approximately 1¼ to 2⅓; one end being connected to the carburetor inlet of the carburetor circuit to discharge the preheated fuel, the other end being connected to the fuel reservoir.

8. A fuel and air preheater as claimed in claim 7 wherein said heating fluid inlet pipe is mounted at the bottom of said tank and said heating fluid outlet pipe is mounted at the top thereof; said coil ends extending through said end walls adjacent said cooling conduit.

9. A fuel and air preheater as claimed in claim 8 including means, at the bottom of said tank for supporting the preheater on the combustion engine block; said means having a vertical fin-like surface in contact with the shell to provide extra cooling surface near the heating fluid inlet pipe.

References Cited by the Examiner

UNITED STATES PATENTS

| 796,686 | 8/1905 | Westendorp | 165—156 X |
| 3,110,296 | 11/1963 | Lundi | 122—122 |

FOREIGN PATENTS

| 51,322 | 1/1942 | France. |
| 684,475 | 3/1930 | France. |

ROBERT A. O'LEARY, Primary Examiner.

CHARLES SUKALO, Examiner.

A. W. DAVIS, Assistant Examiner.